United States Patent [19]

Wittmer et al.

[11] Patent Number: 4,961,207

[45] Date of Patent: Oct. 2, 1990

[54] SYNCHRONIZATION OF DIGITAL SIGNALS WITH ALTERNATING CURRENT

[75] Inventors: Charles M. Wittmer, Trumbull, Conn.; Ronald J. Swanson, Pompton Lakes, N.J.

[73] Assignee: The Perkin-Elmer Corporation, Norwalk, Conn.

[21] Appl. No.: 389,150

[22] Filed: Aug. 2, 1989

[51] Int. Cl.⁵ ........................... H03L 5/00; H03L 7/00
[52] U.S. Cl. ......................................... 377/43; 377/44; 328/72; 328/155; 375/118
[58] Field of Search ...................... 377/43, 44; 328/72, 328/109, 119, 155; 375/118, 119

[56] References Cited

U.S. PATENT DOCUMENTS

| | | | |
|---|---|---|---|
| 3,987,422 | 10/1976 | Yanacidaira et al. | 377/43 |
| 4,168,910 | 9/1979 | Barnard | 356/325 |
| 4,206,414 | 6/1980 | Chapman | 328/72 |
| 4,339,722 | 7/1982 | Sydor et al. | 377/44 |

OTHER PUBLICATIONS

"Phase-Locked Loop Design Fundamentals", by Garth Nash, Application Note AN-535, Motorala Inc. (1970).

Primary Examiner—John S. Heyman
Attorney, Agent, or Firm—H. S. Ingham; E. T. Grimes

[57] ABSTRACT

A circuit for synchronizing digital signals with alternating current includes a first counter that repetitively starts a first counting sequence at a predetermined phase point in each AC line cycle and effects the sequence at a high frequency rate thereby generating a total count during each line cycle. The total count is then divided by a dividing integer to produce a count number. A second counter repetitively starts a second counting sequence at the predetermined phase point and effects the second sequence at the high frequency rate up to the count number continuously during each line cycle. A decoder responsive to the second counter produces a digital output signal at one or more predetermined points in preselected second counting sequences during each line cycle.

14 Claims, 6 Drawing Sheets

SYNCHRONIZATION OF DIGITAL SIGNALS WITH ALTERNATING CURRENT

This invention relates to circuitry for synchronizing digital signals with alternating current, and particularly to such circuitry useful for synchronizing digital processing of spectral signals received through a chopper wheel driven by a synchronous electrical motor.

BACKGROUND OF THE INVENTION

In certain instruments there is a requirement for data processing with real time coordination of digital information with power line cycle alternating current (AC). Of particular interest is the processing of spectral data from spectral beams interrupted by a chopper wheel in a spectrophotometer. An example of such an apparatus is described in U.S. Pat. No. 4,168,910 (Barnard). Specifically it is necessary to synchronize the digital processing with the timing of a beam as it cyclically passes through the chopper wheel being driven by a synchronous electrical motor. Wheel speed is constant only to the extent that the AC cycles are stable, but may fluctuate if the AC phasing changes.

Such synchronizing for a spectrophotometer with a chopper wheel has been effected by analog circuitry with analog/digital conversion, specifically with a so-called phase lock loop circuit. Time pulses associated with the AC are received by a phase detector which produces a DC signal that is filtered and fed to a voltage controlled oscillator. The oscillator has a feedback loop to the phase detector to maintain synchronization. The oscillations are also frequency divided by 512 or other binary-compatible number to generate synchronized signals during each AC cycle. Such a system is described in "Phase-Locked Loop Design Fundamentals" by Garth Nash, Application Note AN-535, Motorola Inc. (1970).

There are several problems associated with a phase lock loop. These include a sensitivity to variations in component manufacture, and instability or "jitter" during operation. Also the loop circuit takes several cycles to resynchronize to a significant phase shift in the AC. A separate analog/digital conversion circuit is required.

At least one effort has been made to create a digital version of the phase lock loop. This required rather extensive circuitry and actually was a frequency lock loop, therefore lacking real coordination with AC cycle phase edges and requiring several cycles to resynchronize.

Timer chips are, of course, well known with respect to digital clocks. These generally are oscillators based on a quartz crystal. The kilohertz level frequencies are reduced to conventional time units by divider circuits that consecutively divide by two with flip-flops. These timers are not readily synchronizable to other oscillators.

Therefore objects of the present invention are to provide a novel circuit for synchronizing digital signals with alternating current, to provide synchronization of signals to AC with an improved response time to phase changes in the AC, to provide a synchronizing circuit substantially free of instabilities, to provide a relatively simple digital circuit for synchronizing, and to provide a novel circuit for synchronizing processing signals with an AC driven chopper wheel in a spectrophotometer.

SUMMARY OF THE INVENTION

The foregoing and other objects are achieved with a synchronizing circuit including pulse means responsive to an alternating current for producing successive line pulses each representative of a predetermined phase point in each line cycle of the alternating current, and clock means for generating clock signals at a selected clock rate of high frequency relative to the alternating current. A first counter means is responsive to the line pulses for repetitively starting a first counting sequence at the predetermined phase point, and further responsive to the clock signals for effecting the first counting sequence at the clock rate to generate a total count during each line cycle. A dividing means is receptive of the total count for dividing the total count by a dividing integer to produce a count number. A save means is receptive of the count number for saving the count number during a next line cycle while the first counter is recounting. A second counter means is responsive to the line pulses for repetitively starting a second counting sequence at the predetermined phase point, and further responsive to the clock signals and the count number for effecting the second counting sequence at the clock rate to generate a second counter output. A decoder means is receptive of the second count output for producing an attainment signal upon attainment of a second count output equivalent to the count number. The second counter is additionally responsive to feedback of the attainment signal to restart the second counting sequence such that the counting to attainment is effected continuously during each next line cycle. The decoder means is further responsive to the second count output for producing one or more digital output signals at one or more predetermined points during each second counting sequence. The digital output signals are directed to a utilization system associated with the alternating current. The digital output signals and the alternating current are thereby synchronized in a predetermined phase relationship.

In a preferred embodiment the first counter means comprises a data bit counter arranged to stack bits in an upper segment and a lower segment such that the lower segment receives data bits first-in, and the dividing means comprises first latch means for latching only the upper segment bits. The lower segment bits thus constitute the dividing integer and the upper segment bits constitute the count number.

In an additional aspect of the invention the circuit further comprises third counter means receptive of the line pulses and the attainment signals, for being incremented by each attainment signal to produce increment counts up to a total number of increments such as to produce further output signals in response to the attainment signals.

DETAILED DESCRIPTION OF THE INVENTION

Figure 1:
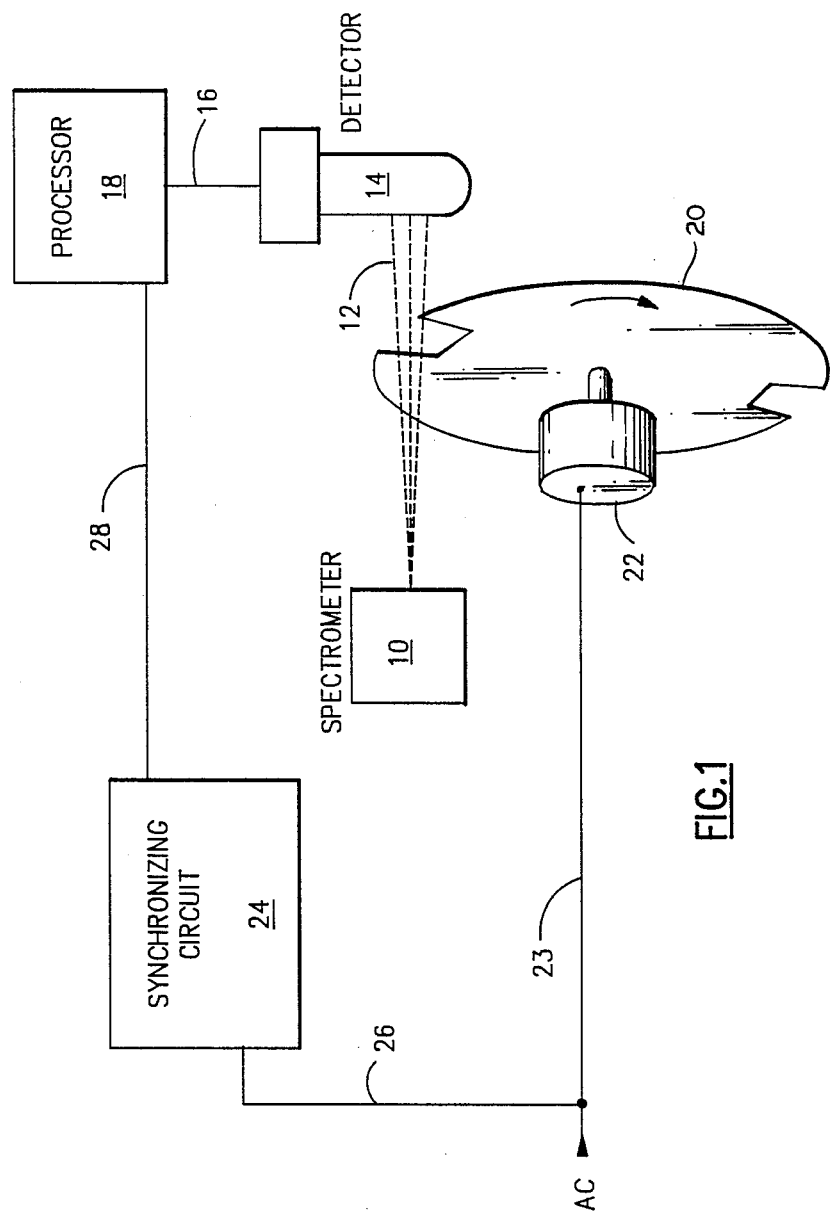
FIG. 1 is a simplified block diagram of a spectrophotometer incorporating the invention.

FIG. 1 is a simplified diagram of an example of a utilization of the invention with an instrument such as an optical spectrophotometer. A spectrometer 10 produces a spectrally dispersed light beam 12 generally consisting of a portion of a spectrum such as a spectral line. For simplicity only one beam is shown; such an instrument typically is dual beam, one from a light source passed through a sample and the other from the light source bypassing the sample. Beam 12 is received by a detector 14 which provides a proportionate signal on a line 16 to a data processor 18. The beam is periodically interrupted with a chopper wheel 20 in order to process data for short, cyclic time intervals. The wheel is driven by a synchronous electrical motor 22 with the AC on a line 23, basically at constant speed determined by the frequency of line power alternating current (AC) such as 50 or 60 hertz. The real time processing of data from detector 14 is synchronized to the wheel rotation. A synchronizing circuit 24 receptive of the AC signal on line 26 effects this synchronization according to the present invention, providing signals on a line or bus 28 to processor 18.

Figure 2:
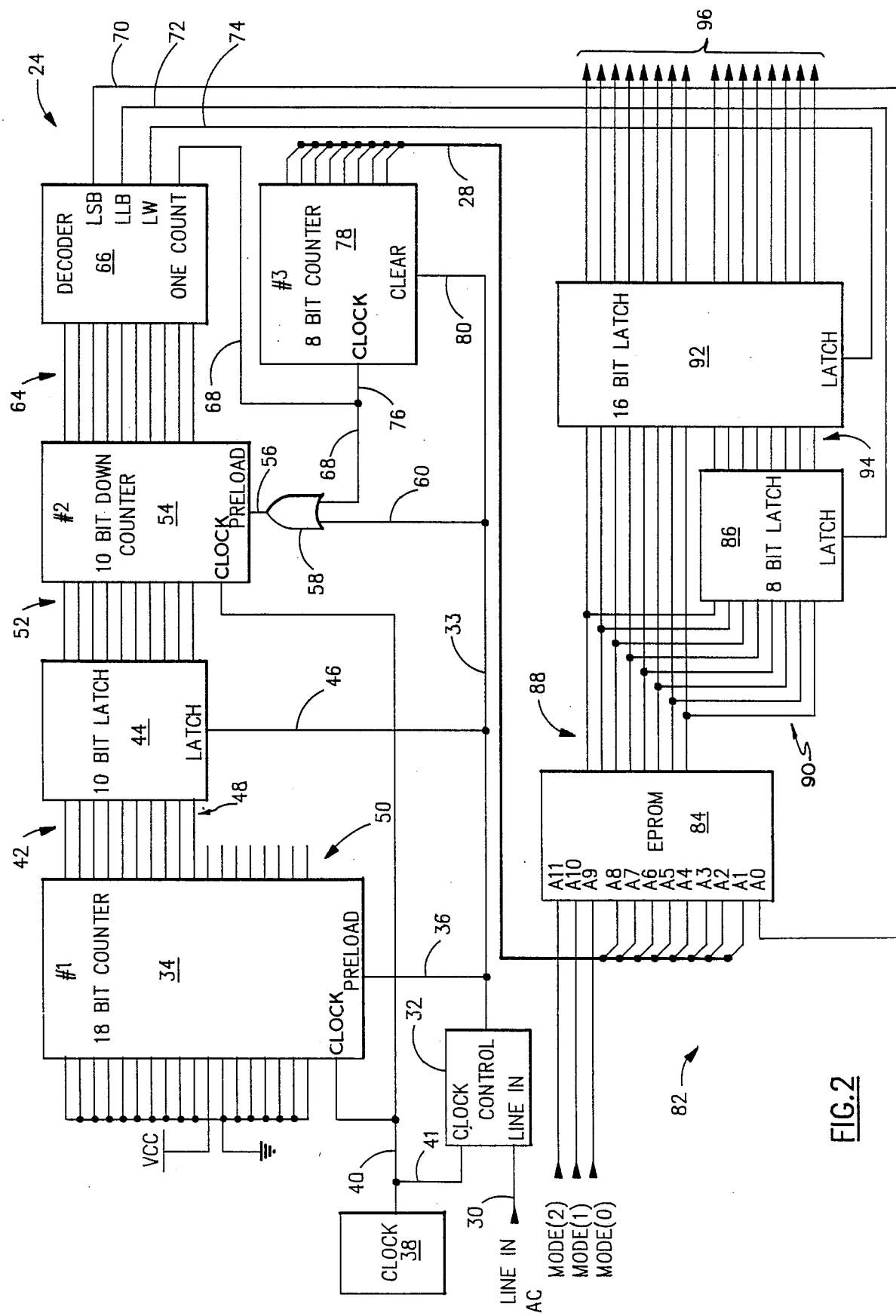
FIG. 2 is a block circuit diagram of an embodiment of the invention.

An electronic circuit 24 for synchronizing digital signals with the AC according to an embodiment of the invention is shown schematically in the block diagram of FIG. 2. An AC signal typically at line frequency is applied to a line-in terminal 30 of a pulse control circuit 32. The AC signal may simply be sinusoidal line power directly or through a transformer, or may be in the form of a square wave or a pulse chain at the line frequency. For example an optical looker (not shown) comprising a light emitting diode and a phototransister may be positioned at the chopper wheel to generate AC signal pulses at the wheel rotation frequency. More broadly, the term "alternating current" (AC) herein means any such oscillatory current or pulse chain with a nominal frequency whether or not associated with ordinary line power.

Figure 3:
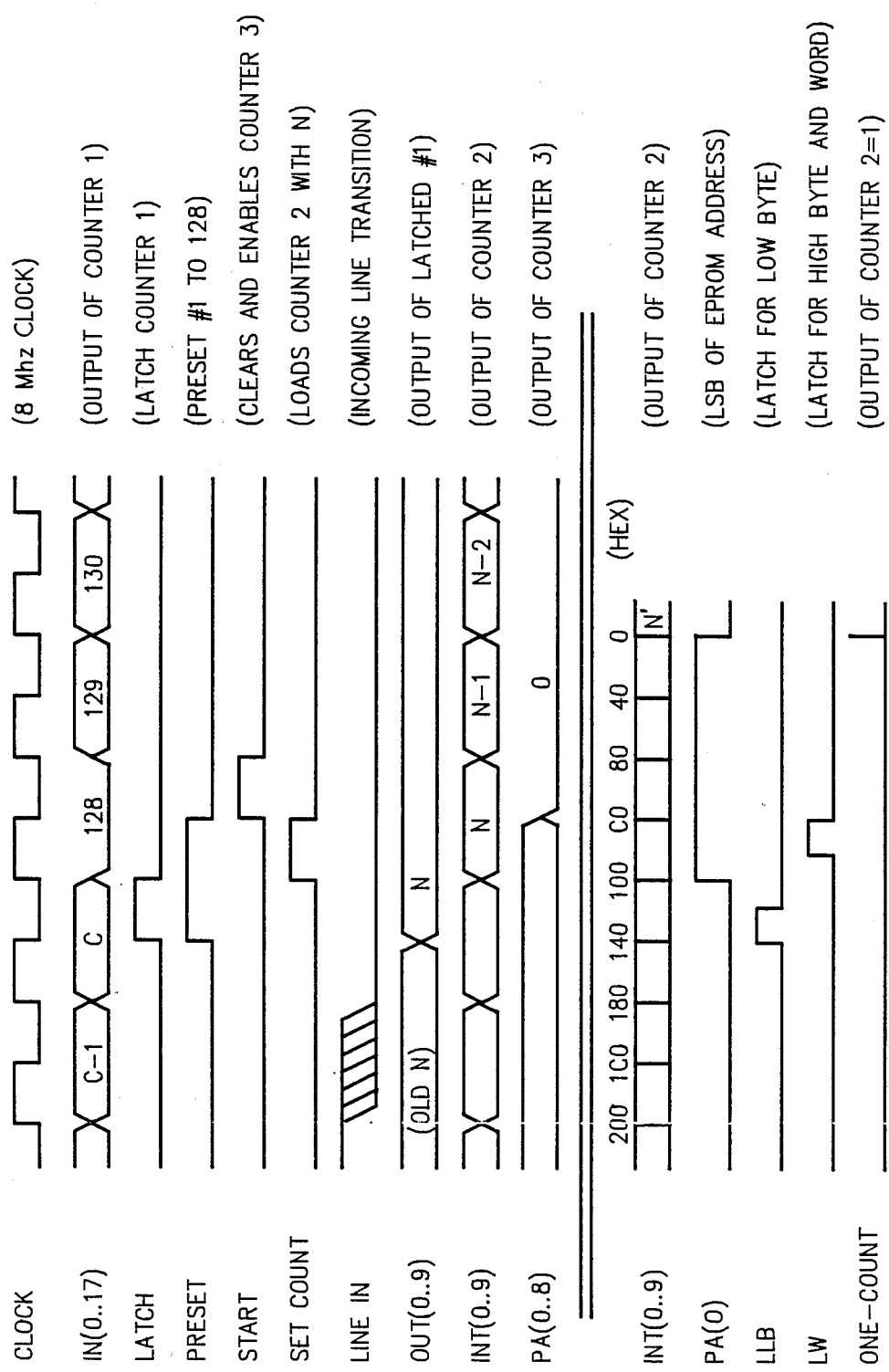
FIG. 3 is a timing diagram for various signals generated in the circuit of the invention.

Pulse means 32 produces successive line pulses on at least one pulse line 33. The pulses are each representative of a predetermined phase point in each cycle of the AC, for example timed closely to the rising edge of the AC line signal crossing zero or the beginning of a pulse from an optical looker. Three line pulse chains are preferably utilized, identified hereunder as "latch", "preset" and "start", these having only slight differences in phasing and/or pulse durations. The relative timing of these and other signals are shown in FIG. 3.

At the beginning of each AC cycle a first counter 34 is responsive to a preset line pulse on a line 36 for presetting and commencing a first counting sequence at the predetermined phase point. This causes clearing and preloading of the first counter with a preload count of 128 or, more generally, about half of an integer number defined below. The purpose of the preload is to provide rounding to the nearest integer of an output latched from the first counter.

A clock 38, driven conventionally by a quartz crystal, has a selected high frequency substantially higher than the AC frequency, preferably at least one order of magnitude higher and advantageously between about 1 Kz and 12 MHz, such as 8 MHz. The clock generates clock signals on a line 40 at the clock frequency rate. The clock signals on a side line 41 may be utilized for phasing in the control 32. Counter 34 is responsive to the clock signals or, more generally to the predetermined phase point, for effecting a first counting sequence at the 8 MHz (or other) clock rate to generate a total count "C" corresponding to the number of clock signals received during the line cycle (e.g. during 1/60 second). This counter stacks data bits on its output. The stack comprises a lower segment and an upper segment, with the lower segment receiving the first-in bits during the count. The first counter 34 is advantageously an 18 bit counter which is sufficient to count up to an effective clock value C of (8 MHz*1/60 sec) plus 128, or otherwise has a capacity required for attaining a selected clock value.

A first latch circuit 44 is connected to a bus 42 from the first counter such as to latch bits from counter 34 when a latch line pulse is received from a line 46 on a latch terminal. This latch circuit 44 also serves as a dividing means to divide the clock value by a selected integer "I", by receiving only the bits from selected upper segment 48 of counter 34. The bits in the remaining lower segment 50 are dropped out and determine the value of the dividing integer. If 8 bits are in the lower segment, the integer is 256, thereby dividing the clock value by 256. More broadly, in this preferred aspect of digital processing, the integer is $2^n$ where n is a relatively small integer advantageously between 2 and 12 inclusively, preferably 8 so as to provide the integer 256. The 10 bits in segment 48 are latched through and saved as a present count number "N", representing the clock value C divided by the integer I, on a second bus 52 to a second counter 54. At about the same time first counter 34 is reset, i.e, emptied and reloaded with 128, by a line pulse and started for recounting to generate a succeeding clock value during the next AC cycle.

Second counter 54 is receptive of the clock signals or, more generally of the predetermined phase point, so as to effect a second counting sequence at the clock rate (8 MHz). This counter 54 starts counting when it is pulsed on a line 56 by a set count signal via an OR gate 58 (or its equivalent) by a "start" line pulse on line 60 and receives as a preload the latched upper segment of 10 bits on line 62 representing the count number N. The second counter is advantageously a 10 bit down-counter which counts down from count number N, placing the ongoing count as a second counter output onto a bus 64 while latch 44 saves the number N on bus 52.

The second counter feeds a decoder 66 via bus 64. The decoder senses when the full count down to one is attained, and at that point in time produces an attainment signal on a line 68. This signal is fed back to down counter 54 via OR gate 58 as a set count signal to immediately restart the count down from number N, for repetitive nonstop counting for the nominal duration of the line cycle. If there is no change in the phase time of the AC line signal, the countdown from count number N is thus effected 256 times during the cycle or, more generally, for a number of times equal to the dividing integer I that produced the count number N. When the next line pulse arrives on line 56, via line 60, counter 54 is reset through the OR gate and also receives a succeeding count number N' on bus 52 from latch 44 from which it then down-counts. FIG. 3 illustrates timing sequences.

Thus second counter 54 functions as a digital clock during each line cycle, with each period initiated and ended by line pulses, and extended or cut short by any change in the timing of the AC line signal. The attainment signal flags up to 256 points of time during each line cycle, and this signal may be used also as an output signal to the utilization system. The decoder may be programmed further to produce one or more other output signals on output lines, three shown at 70,72,74, during each count down. The series of output signals will be synchronized to the AC, specifically to each preceding line cycle. The decoder may be arranged and programmed to produce any reasonable number of output signals, including as little as one digital output signal during a line cycle, at a predetermined point in one preselected counting sequence, e.g. in sequence number 100 in the 256 count.

In a preferred embodiment the attainment signal is sent additionally on a line 76 to a third counter 78. The third counter is cleared at the beginning of each line cycle by a "start" line pulse on a line 80. Thereafter, for the duration of each AC cycle, counter 78 is incremented by each attainment signal to produce increment counts up to a total number of increments not exceeding the selected integer. If the AC timing is unchanged the total number of increments will be a count effectively equal to the integer (read digitally as one less, viz. 255, since the count starts at zero) when the next line cycle begins and the counter is reset to zero.

If an AC line transition and resulting line pulse occurs early (before the third counter has reached 255) a new cycle will start and the old cycle will end, regardless of the count in third counter 78. Optionally, if the line transition is delayed, counter 78 will hold (e.g. at 255) until a new line cycle starts. This keeps the circuit synchronized to the AC even if the frequency changes quickly. At most the delay before correction is one line cycle. The reason for holding at 255 is that this may represent the maximum addressable information available in subsequent circuits.

To illustrate a use of the output signals, third counter 78 of the present embodiment provides on bus 28 an 8 bit output byte corresponding to each of the successive incrementing totals during a count. The lower circuitry 82 of FIG. 2 constitutes an advantageous portion of a digital processing section of the utilization system, which receives output signals from decoder 66 and counter 78. This circuitry 82 includes a programmable memory device 84 such as an erasable-programmable read-only memory (EPROM) programmed as desired for processing spectral data of the instrument. The circuitry further includes an eight bit second latch 86 which taps via a bus 90 a memory output byte on a bus 88 out of the EPROM to latch a lower byte on a bus 94, and a 16 bit third latch 92 for latching both the lower byte from bus 94 and an upper byte from bus 88 onto an output bus 96 to further components (not shown) of processor 18 (FIG. 1). The two bytes out of latch 92 are then utilized for processing the instrument data as desired.

The 8 bit byte on bus 28 addresses EPROM 84 for the duration of each N countdown, and output signals from the decoder (FIG. 3) are applied during the countdown in sequence. A further memory address signal LSB on line 70 addresses the least significant bit (LSB) of the EPROM during each N count-down cycle. During the first portion of the count-down cycle, the LSB is set to zero. A "latch low byte" (LLB), which is a second latch signal on line 72 from the decoder, is pulsed high, and the EPROM byte is latched through the 8 bit latch 86. As the N count-down falls, the decoder outputs a one at LSB and then pulses a "latch word" (LW) third latch signal on line 74 to the 16 bit latch 92. This latches a subsequent EPROM memory output byte (shifted by LSB address) as the upper byte on bus 88, along with the lower byte via bus 94. This sequence is repeated each N count-down cycle, providing a preprogrammed word at a predetermined point each 1/256th of each AC cycle.

Figure 4A:
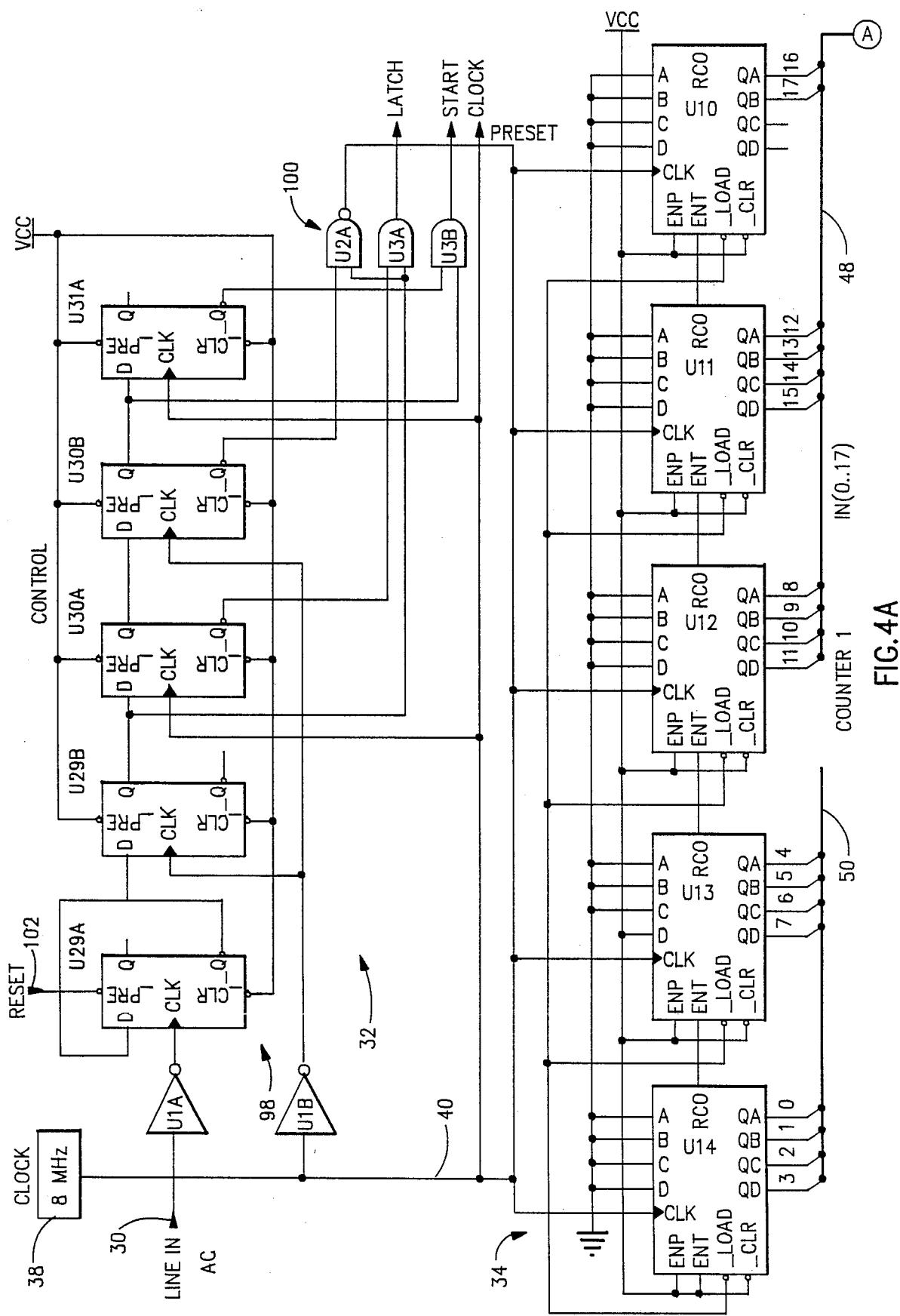
FIG. 4, consisting of 4(A) and 4(B), is a schematic circuit diagram of certain components of FIG. 2.

FIGS. 4 (A and B) and 5 are more detailed schematic diagrams of some of the components of FIG. 2. The components may be formed conventionally of transistor-transistor logic elements on a 2 micron CMOS chip about 5 cm square. Numeral identification of corresponding components is the same as for FIG. 2.

Figure 4B:
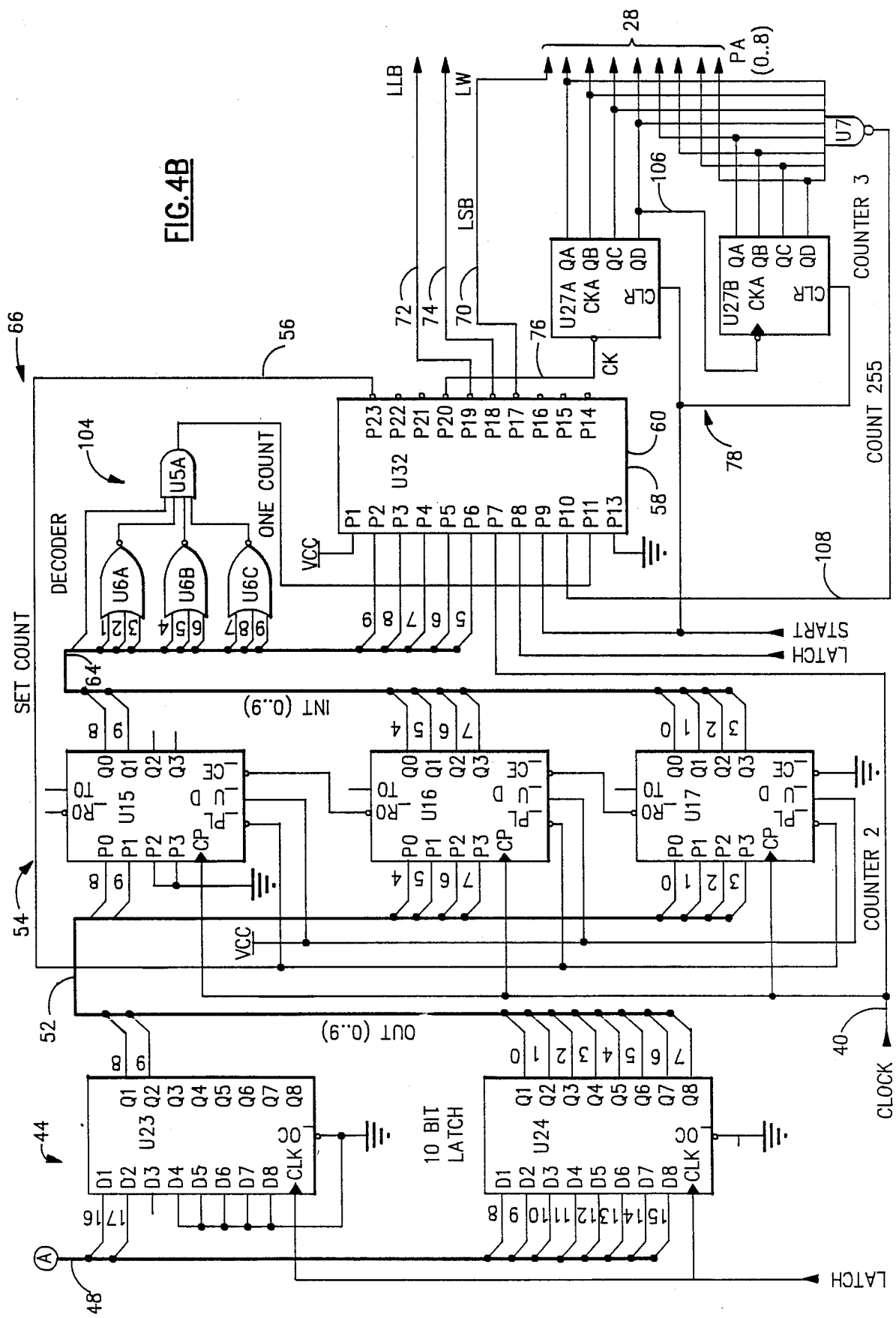

Pulse controller 32 (FIG. 4A) is comprised of a set of flip-flops 98 and gates 100 to generate the line pulses for the latch, start and preload line pulses. A reset 102 is also provided. The line-in actually receives 120 Hz pulses previously converted (not shown) from 60 Hz sinusoidal line power. First counter 34 is formed of five data bit counters driven by the clock signals on line 40 and preloaded with 128 with the applied voltage VCC and ground appropriately inputed. In FIG. 4B, the 10 bit latch 44 has two portions receptive of the latch line pulses. Down counter 54 is formed of three counters which load and save the count number (N) bits on input bus 52. These counters are also inputed by the clock signals on line 40.

Figure 5:
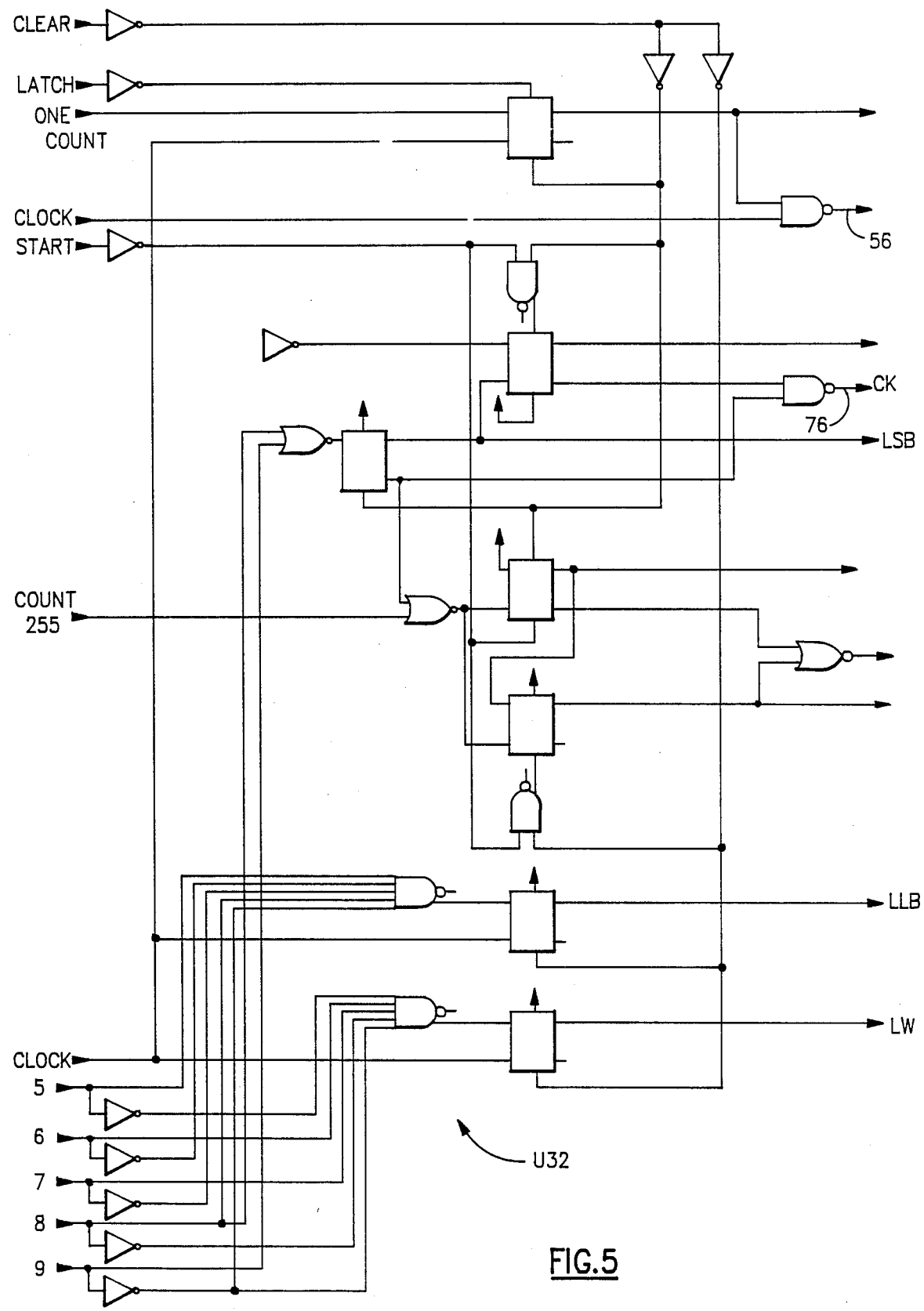
FIG. 5 is a schematic circuit diagram of a component of FIG. 4.

Decoder 66 comprises four gates 104 which sense when the down count reaches one, and a programmable logic device U32, shown as a combination of gates and flip-flops in FIG. 5. Device U32 also provides the function of OR gate 58 (FIG. 2), and has additional outputs for information not illustrated herein.

The incrementing "set" count feeds back on line 56 to second counter 54. The one count is fed as "CK" on line 76 to third counter 78 formed by two counters in cascade. Incrementing of the second counter occurs via a line 106 when the first is filled. NAND gate U7 responds when all counters are filled and feeds back on a line 108 to device U32 when the increments reach 255, which blocks further incrementing. The 8 bit count status of counter 78 and the LSB proceed on bus 28 (also identified as "PA(0.8)") to the EPROM (FIG. 2).

It may be seen that the aforedescribed circuitry functions as a line synchronized digital rate multiplier for analog to digital conversion. It does not have the usual problems associated with such analog circuitry as a phase lock loop. Specifically it is not sensitive to variations in device production, does not display jitter, and has a response time of only one cycle. The circuit is not sensitive to line frequency and, for example, can be utilized with AC between about 40 and 70 Hz without customizing.

While the invention has been described above in detail with reference to specific embodiments, various changes and modifications which fall within the spirit of the invention and scope of the appended claims will become apparent to those skilled in this art. The invention is therefore only intended to be limited by the appended claims or their equivalents.

What is claimed is:

1. A circuit for synchronizing digital signals with alternating current, comprising:
   first counter means responsive to a predetermined phase point in each line cycle of an alternating current, for repetitively starting a first counting sequence at the predetermined phase point and effecting the first counting sequence at a high frequency rate relative to the alternating current, thereby generating a total count during each line cycle;

dividing means receptive of the total count for dividing the total count by a dividing integer to produce a count number;

second counter means responsive to the predetermined phase point for repetitively starting a second counting sequence at the predetermined phase point, and further responsive to the count number for effecting the second counting sequence at the high frequency rate so as to count to the count number continuously during each line cycle; and decoder means responsive to the second counter for producing a digital output signal at a predetermined point in a preselected second counting sequence during each line cycle, whereby the digital output signal and the alternating current are in a predetermined phase relationship.

2. A circuit for synchronizing digital signals with alternating current, comprising:

pulse means responsive to an alternating current for producing successive line pulses each representative of a predetermined phase point in each line cycle of the alternating current;

clock means for generating clock signals at a selected clock rate of high frequency relative to the alternating current;

first counter means responsive to the line pulses for repetitively starting a first counting sequence at the predetermined phase point, and further responsive to the clock signals for effecting the first counting sequence at the clock rate to generate a total count during each line cycle;

dividing means receptive of the total count for dividing the total count by a dividing integer to produce a count number;

save means receptive of the count number for saving the count number during a next line cycle while the first counter is recounting;

second counter means responsive to the line pulses for repetitively starting a second counting sequence at the predetermined phase point, and further responsive to the clock signals and the count number for effecting the second counting sequence at the clock rate to generate a second counter output; and decoder means receptive of the second count output for producing an attainment signal upon attainment of a second count output equivalent to the count number;

the second counter being additionally responsive to feedback of the attainment signal to restart the second counting sequence such that the counting to attainment is effected continuously during each next line cycle; and the decoder means being further responsive to the second count output for producing one or more digital output signals at one or more predetermined points during each second counting sequence, the digital output signals being directed to a utilization system associated with the alternating current, whereby the digital output signals and the alternating current are synchronized in a predetermined phase relationship.

3. The circuit according to claim 2 wherein the one or more digital output signals include the attainment signal.

4. The circuit according to claim 2 wherein the first counter means comprises a data bit counter arranged to stack bits in an upper segment and a lower segment such that the lower segment receives data bits first-in, and the dividing means comprises first latch means for latching only the upper segment bits, whereby the lower segment bits constitute the dividing integer and the upper segment bits constitute the count number.

5. The circuit according to claim 4 wherein, in response to a line pulse, the first counter means is cleared and preloaded with a preload count equal to about half of the dividing integer.

6. The circuit according to claim 5 wherein the selected clock rate is between about 1 KHz and 12 MHz, and the dividing integer has a value of $2^n$ where n is a small integer between 2 and 12 inclusively.

7. The circuit according to claim 6 wherein the dividing integer is 256.

8. The circuit according to claim 7 wherein the selected clock rate is about 8 MHz.

9. The circuit according to claim 2 wherein the second counter register is a down-counter from the count number.

10. The circuit according to claim 2 further comprising third counter means receptive of the line pulses and the attainment signals, for being incremented by each attainment signal to produce increment counts up to a total number of increments such as to produce further output signals in response to the attainment signals.

11. The circuitry according to claim 10 wherein the total number of increments is limited so as not to exceed the integer.

12. The circuit according to claim 10 wherein the further output signals comprise an output byte.

13. The circuit according to claim 12 wherein the digital output signals of the decoder include a second latch signal, and the utilization system comprises a programmable memory device addressed by the output byte so as to provide a memory output, and further comprises a second latch circuit receptive of the memory output and responsive to the second latch signal such as to latch the memory output as a memory byte at a first predetermined point during each second counting sequence.

14. The circuit according to claim 13 wherein the digital output signals further include a memory address signal and a subsequent second latch signal sequentially following the first decoder output signal, with the memory address signal being directed to further address the memory device to provide a subsequent memory output, and the utilization system further comprises a third latch circuit receptive of the subsequent memory output and the memory byte, the third latch circuit being responsive to the third latch signal such as to further latch the subsequent memory output and the memory byte simultaneously at a second predetermined point during each second counting sequence.

* * * * *